(12) United States Patent
Isaacs et al.

(10) Patent No.: US 7,015,865 B2
(45) Date of Patent: Mar. 21, 2006

(54) MEDIA WITH CONTROLLABLE REFRACTIVE PROPERTIES

(75) Inventors: Eric D Isaacs, Short Hills, NJ (US); Carsten Metz, Township of Chatham, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/797,399

(22) Filed: Mar. 10, 2004

(65) Prior Publication Data

US 2005/0200540 A1    Sep. 15, 2005

(51) Int. Cl.
*H01Q 3/00*    (2006.01)

(52) U.S. Cl. .................... 343/757; 343/874; 343/876

(58) Field of Classification Search ............... 343/757, 343/874, 876, 909
See application file for complete search history.

(56) References Cited

U.S. PATENT DOCUMENTS

| | | | |
|---|---|---|---|
| 3,543,271 A | 11/1970 | Scheel | 343/705 |
| 3,765,024 A | 10/1973 | Chiron et al. | 343/854 |
| 4,090,198 A | 5/1978 | Canty et al. | 343/18 D |
| 5,361,050 A * | 11/1994 | Einbinder | 333/204 |
| 5,598,172 A | 1/1997 | Chekroun | 343/754 |
| 6,002,368 A | 12/1999 | Faraone et al. | 343/700 |
| 6,046,701 A | 4/2000 | Carey et al. | 343/753 |
| 6,424,319 B1 | 7/2002 | Ebling et al. | 343/911 |
| 6,473,050 B1 | 10/2002 | Foncin | 343/754 |
| 6,597,318 B1 | 7/2003 | Parsche et al. | 343/700 |
| 6,621,448 B1 | 9/2003 | Lasky et al. | 342/22 |
| 6,661,392 B1 | 12/2003 | Isaacs et al. | 343/911 |
| 6,791,432 B1 * | 9/2004 | Smith et al. | 333/99 S |
| 6,865,402 B1 * | 3/2005 | Gilbert | 455/562.1 |
| 6,933,812 B1 * | 8/2005 | Sarabandi et al. | 333/219 |
| 2002/0175693 A1 | 11/2002 | Starr et al. | 324/702 |
| 2004/0066251 A1 * | 4/2004 | Eleftheriades et al. | 333/117 |

FOREIGN PATENT DOCUMENTS

| | | |
|---|---|---|
| DE | 4119518 | 1/1998 |
| FR | 2747842 | 6/1990 |
| GB | 2 387 031 | 10/2003 |
| WO | WO 03/044897 | 5/2003 |
| WO | WO 03/054592 | 7/2003 |
| WO | WO 03/087904 | 10/2003 |

OTHER PUBLICATIONS

R. A. Shelby, et al, "Experimental Verification of a Negative Index of Refraction", *Science*, vol. 292, (Apr. 6, 2001), pp. 77-79.

R. A. Shelby, et al, "Microwave Transmission Through a Two-Dimensional, Isotropic, Left-Handed Metamaterial", *Applied Physics Letters, American Institute of Physics, New York*, vol. 78, No. 4, (Jan. 22, 2001), pp. 489-491.

(Continued)

*Primary Examiner*—Shih-Chao Chen
(74) *Attorney, Agent, or Firm*—John F. McCabe

(57) ABSTRACT

An apparatus includes a 3D array of circuit elements and control lines for coupling a remote control device to the circuit elements in the array. Each circuit element is configured to transform from one circuit state to another circuit state in response to a change in a control signal received from one of the control lines. The 3D array includes a region that behaves as a metamaterial in a selected frequency when the circuit elements of the region are in one set of circuit states and as a normal refractive medium in the selected frequency when the circuit elements of the region are another set of circuit states.

17 Claims, 10 Drawing Sheets

OTHER PUBLICATIONS

Lixin Ran, et al, "Beam Shifting Experiment for the Characterization of Left-Handed Properties", *Journal of Applied Physics*, vol. 95, No. 5, (Mar. 1, 2004), pp. 2238-2241.

Chekroun Claude, "Microwave Lens With Panel of Stacked Phase Shifting Channels," *Abstract of French Patent FR 2747842*, (Oct. 24, 1997), published at esp@cenent online database, 1 page.

European Search Report for Appl. No. 05251005.4-1248-, (May 30, 2005).

Pendry, J.B. et al., "*Extremely Low Frequency Plasmons in Metallic Mesostructures*," Physical Review Letters, vol. 76, No. 25, pp. 4773-4776, Jun. 17, 1996.

Shelby, R.A. et al., "*Experimental Verification of a Negative Index of Refraction*," Science, vol. 292, pp. 77-79, Apr. 6, 2001.

Kolinko, P. et al., "*Numerical study of electromagnetic waves interacting with negative index materials*," Optics Express, vol. 11, No. 7, pp. 640-648, Apr. 7, 2003.

Shelby, R.A. et al., "*Microwave transmission though a two-dimensional, isotropic, left-handed metamaterial*," Applied Physics Letters, vol. 78, No. 4, pp. 489-491, Jan. 22, 2001.

Grbic, A. et al., "*Experimental verification of backward-wave radiation from a negative refraction index metamaterial*," Journal of Applied Physics, vol. 92, No. 10, pp. 5930-5935, Nov. 15, 2002.

Eleftheriades, G.V. et al., "*Planar Negative Refractive Index Media Using Periodically L-C Loaded Transmission Lines*," IEEE Transactions on Microwave Theory and Techniques, vol. 50, No. 12, pp. 2702-2712, Dec. 2002.

Eleftheriades, G.V., et al., "*Transmission Line Models for Negative Refractive Index Media and Associated Implementations Without Excess Resonators*," IEEE Microwave and Wireless Components Letters, vol. 13, No. 2, pp. 51-53, Feb. 2003.

Pendry, J.B., "*Negative Refraction Makes a Perfect Lens*," Physical Review Letters, vol. 85, No. 18, pp. 3966-3969, Oct. 30, 2000.

Markos, P. et al., pre-print for: "*Structures with negative index of refraction*," Physica Status Solidi A-Applied Research, vol. 197, No. 3, pp. 595-604, Wiley, Weinheim, Germany, Jun. 2003.

Smith, D.R. et al., "*Negative Refractive Index in Left-Handed Materials*," Physical Letters, vol. 85, No. 14, pp. 2933-2936, Oct. 2, 2000.

Pendry, J.B., "*Magnetism from Conductors and Enhanced Nonlinear Phenomena*," IEEE Transactions on Microwave Theory and Techniques, vol. 47, No. 11, pp. 2075-2084, Nov., 1999.

Sievenpiper, D.F. et al., "*3D Metallo-Dielectric Photonic Crystals with Strong Capacitive Coupling between Metallic Islands*," Physical Review Letters, vol. 80, No. 13, pp. 2829-2832, Mar. 30, 1998.

Wiltshire, M.C.K., "*Bending Light the Wrong Way*," Science, vol. 292, No. 5514, pp. 60-61, Apr. 6, 2001.

Smith, D.R. et al., "*Composite Medium with Simultaneously Negative Permeability and Permittivity,*" Physical Review Letters, vol. 84, No. 18, pp. 4184-4187, May 1, 2000.

Johnson, R.C., "'*Metamaterial*' holds promise for antennas," optics, http://www.eetimes.com/storyOEG20010430S0110, EE Times, May 11, 2001, pp. 1-3.

Smith, D.R. et al., "*Loop-wire Medium for Investigating Plasmons at Microwave Frequencies*," Applied Physics Letters, vol. 75, No. 10, Sep., 1999, pp. 1425-1427.

Smith, D.R., et al., "*Direct Calculation of Permeability and Permittivity for a Left-handed Metamaterial*," Applied Physcics Letters, vol. 77, No. 14, Oct. 2000, pp. 2246-2248.

Meeting Invitation for "Darpa Meta-Materials Workshop, Sep. 29, 2000," published online at : http://sainc.com/conference/View/Invitation.asp, Greenbelt, MD, 2 pages.

UCSD Press Release, "*UCSD, Physicists Develop New Class of Composite Materials with 'Reversed' Physical Properties Never Before Seen*," Press Conference, Minneapolis, MN, Mar., 2001, 3 pages.

Left Handed Materials, published online by USD at: http://physics.ucsd.edu/~rshelby/lhmedia/intro.html, Mar., 2000, 3 pages.

\* cited by examiner

MEDIA WITH CONTROLLABLE REFRACTIVE PROPERTIES

BACKGROUND

1. Field of the Invention

This invention relates to refractive metamaterials and apparatus and methods that use such materials.

2. Discussion of the Related Art

Media having a negative refractive index are referred to as metamaterials. The refractive index has a negative sign when both dielectric constant, $\in$, and magnetic permeability, $\mu$, have negative real parts at a particular frequency. The negative refractive index causes electromagnetic radiation of the particular frequency to refract abnormally at interfaces between the metamaterial and media with positive refractive indexes. In abnormal refraction, incident and refracted light rays lie on the same side of the interface's normal in the incidence plane.

Metamaterials have been artificially constructed from spatially regular arrays of circuit elements. Some such artificial metamaterials include regular arrays of split ring resonators and wire strips as illustrated by FIGS. 1–4.

FIG. 1 shows a portion of one metamaterial that includes a slab 12. The slab 12 is formed by a 2-dimensional (2D) cubic lattice of rectangular fiberglass boards 14.

FIG. 2 shows a unit cell of the slab's 2D cubic lattice. The unit cell includes two fiberglass boards 14. The dimensions of the fiberglass boards 14 are: thickness of 0.25 millimeters (mm), length of 10 mm, and width of 5 mm.

FIG. 3 shows one of the fiberglass boards 14 of the unit cell. The fiberglass board 14 includes a wire strip 16 on a central axis of the backside of the board 14 and three split ring resonators (SRRs) 18 along the same central axis on the front side of the board 14. The wire strips 16 are formed of a 0.03 mm thick layer of copper. The other dimensions of the wire strips are: length of 10 mm and width of 0.25 mm.

FIG. 4 shows one SSR 18 of the fiberglass board 14. The SSR 18 includes two concentric split rings 20, 22 formed of 0.03 mm thick layers of copper. The dimensions characterizing the split rings 20, 22 are denoted as a, c, d, g, and w, and satisfy: c=0.25 mm, d=0.30 mm, g=0.46 mm, and w=2.62 mm.

In the exemplary metamaterial of FIGS. 1–4, the regular array of SRRs 18 produces the negative real part for $\mu$, and the regular array of wire strips 16 produces the negative real part for $\in$.

SUMMARY

Various embodiments provide for refraction of electromagnetic radiation by media that is able to transform between metamaterial and normal refractive states. Herein, a medium is in a normal refractive state if radiation of a selected frequency propagates in the medium as if the real part of the refractive index is positive. A normal refractive medium may produce small amounts of attenuation of the propagating radiation.

One embodiment provides an apparatus that includes a 3D array of circuit elements and control lines for coupling a remote control device to the circuit elements in the array. Each circuit element is configured to transform from one circuit state to another circuit state in response to a change in a control signal received from one of the control lines. The 3D array includes a region that behaves as a metamaterial in a selected frequency when the circuit elements of the region are in one set of circuit states and as a normal refractive medium in the selected frequency when the circuit elements of the region are another set of circuit states.

Another embodiment provides a system for wireless transmission or wireless reception. The system includes one of a wireless transmitter and a wireless receiver and a refractive medium located to intercept beams of electromagnetic radiation one of transmitted from the transmitter and received by the receiver. The one of a wireless transmitter and a wireless receiver has a wireless communication frequency. The refractive medium includes a 3D region capable of transforming between first and second states. In the first state, the 3D region is a metamaterial at the wireless communication frequency. In the second state, the 3D region is a normal refractive medium at the wireless communication frequency. The refractive medium is configured to steer one of the intercepted beams between a first direction and the one of a transmitter and a receiver when the 3D region is in the first state. The refractive medium is configured to steer one of the intercepted beams between a different second direction and the one of a transmitter and a receiver when the 3D region is in the second state.

Another embodiment provides a method for wireless transmission or wireless reception. The method includes selecting a first transmission or reception direction for a wireless communication, transmitting optical or electrical control signals to a 3D medium, and then, steering a beam of electromagnetic radiation between the selected first direction and one of a wireless transmitter and a wireless receiver. The control signals transform a region of the 3D medium from being in a normal refractive state at a frequency to being in a metamaterial state at the same frequency. The radiation has the same frequency. The steering includes refracting the beam at an interface between the region and a normal refractive medium.

BRIEF DESCRIPTION OF THE DRAWINGS

In the figures and text, like reference numbers refer to functionally similar features.

DETAILED DESCRIPTION OF ILLUSTRATIVE EMBODIMENTS

Herein, various embodiments are described more fully with reference to the accompanying figures and detailed description. The invention may, however, be embodied in various forms and is not limited to the embodiments described herein.

Figure 1:
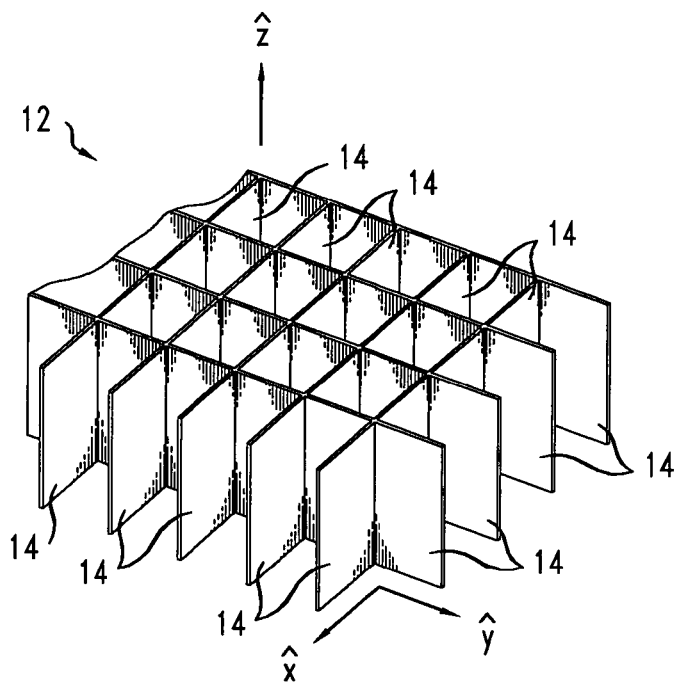
FIG. 1 is an oblique view of a portion of a conventional metamaterial.
Figure 2:
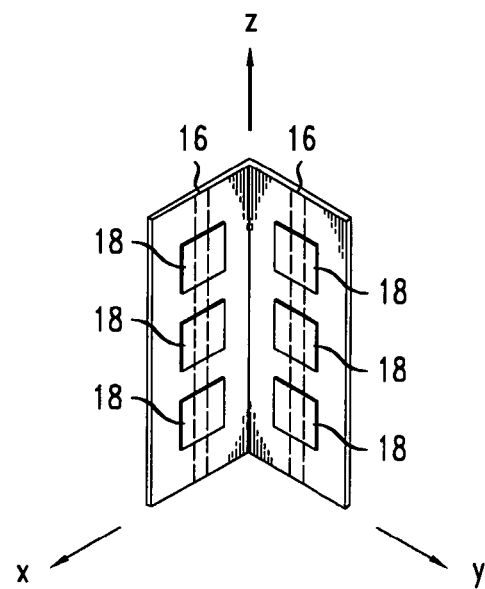
FIG. 2 is an oblique view of one unit cell in the metamaterial of FIG. 1.
Figure 3:
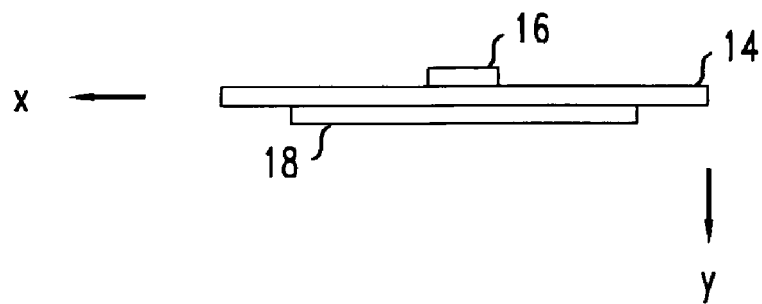
FIG. 3 is a cross-sectional view from the top of one circuit board of FIG. 2.
Figure 4:
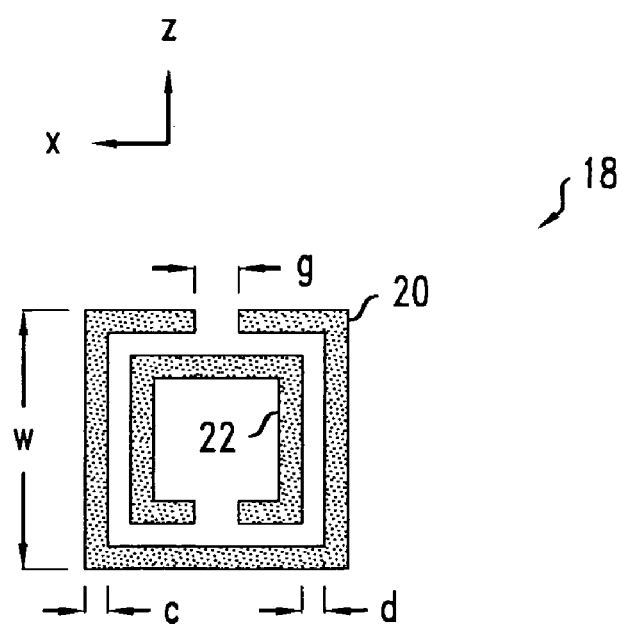
FIG. 4 is a front view of one split ring resonator (SRR) of FIGS. 2–3.
Figure 5A:
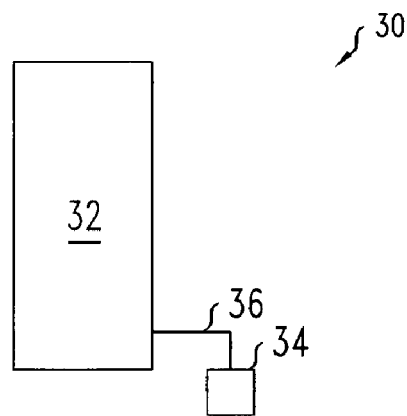
FIG. 5A illustrates a configuration of the refractive medium of FIG. 5 in which a wedge-shaped region behaves as a metamaterial.
Figure 5B:
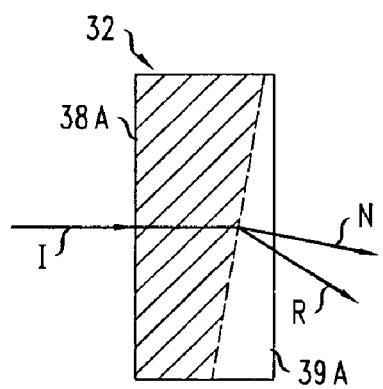
FIG. 5B illustrates a configuration of the refractive medium of FIG. 5 in which a concave-shaped region behaves as a metamaterial.
Figure 5C:
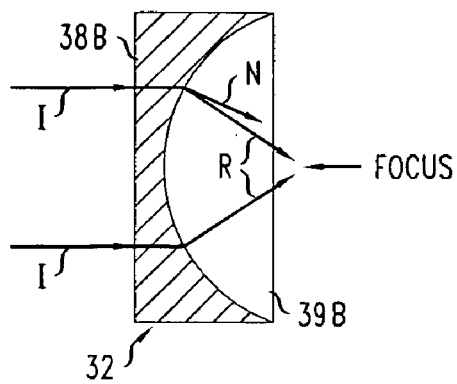
FIG. 5 shows a device that includes a refractive medium with controllable refraction properties.

FIG. 5 shows a device 30 that provides variable and controllable refraction properties. The device 30 includes a refractive structure 32, a control device 34, and control lines 36 connecting the control device 34 to the refractive structure 32. The refractive structure 32 is a 3-dimensional (3D) medium that has controllable refractive properties in a selected wavelength range. Individual 3D sub regions of the refractive structure 32 are able to behave either as metamaterials or as normal refractive media for electromagnetic radiation in the selected wavelength range. The refractive states of these 3D regions are reversibly controlled by voltage or optical control signals delivered to the 3D medium via the control lines 36. Control device 34 changes the refraction properties of the 3D regions between by changing the control signals applied to the control lines 36.

Two exemplary refractive configurations for the refractive structure 32 are shown in FIGS. 5A and 5B.

FIG. 5A shows a configuration in which a wedge-shaped region 38A of refractive structure 32 behaves as a metamaterial and the remaining region 39A behaves as a normal refractive medium. In this state, the refractive structure 32 refracts an incident ray, I, to produce a refracted ray, R. At the interface between the metamaterial 38A and the normal refractive media 39A, the incident and refracted rays I, R lie in the incidence plane and lie on the same side of normal vector, N, to the refracting interface.

FIG. 5B shows a second configuration in which concave-shaped region 38B of refractive structure 32 behaves as a metamaterial and remaining region 39B behaves as a normal refractive medium. In this state, the refractive structure 32 refracts incident rays, I, to produce refracted rays, R. In this state, the refracted rays, R, converge toward a focus.

An exemplary construction of a homogeneous medium for refractive structure 32 of FIGS. 5, 5A, and 5B are illustrated in FIGS. 6–10 and 11A–11B. The construction includes a spatially regular 3D array of split ring resonators (SRRs) and wire strips. The construction behaves as a 3D medium, because the regular lattice of the 3D array has a lattice dimensions that are small compared to the wavelength of electromagnetic radiation to be refracted therein. Exemplary electromagnetic radiation may, e.g., include microwaves, millimeter waves, or sub millimeter waves.

Figure 6:
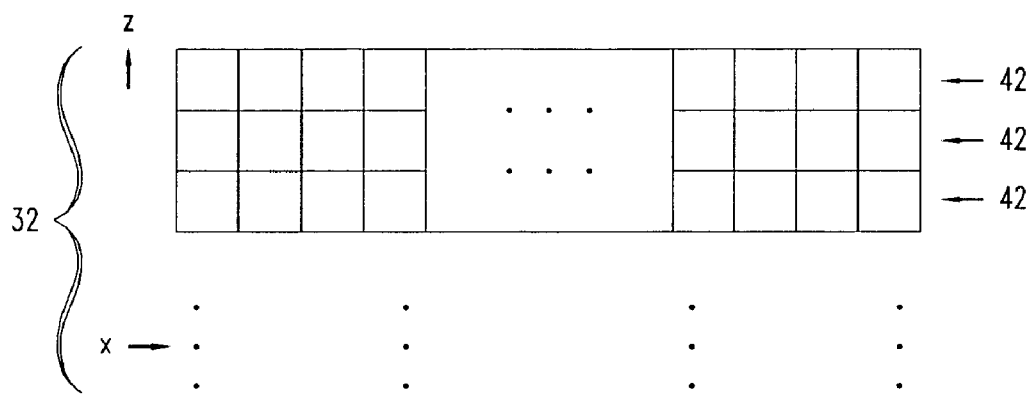
FIG. 6 is a cross-sectional view of one embodiment of the refractive medium of FIG. 5.

Referring to FIG. 6, refractive structure 32 includes a regular stack of identical planar slabs 42. The planar slabs 42 of the stack are aligned so that the refractive structure 32 is spatially uniform along stacking direction, z.

Figure 7:
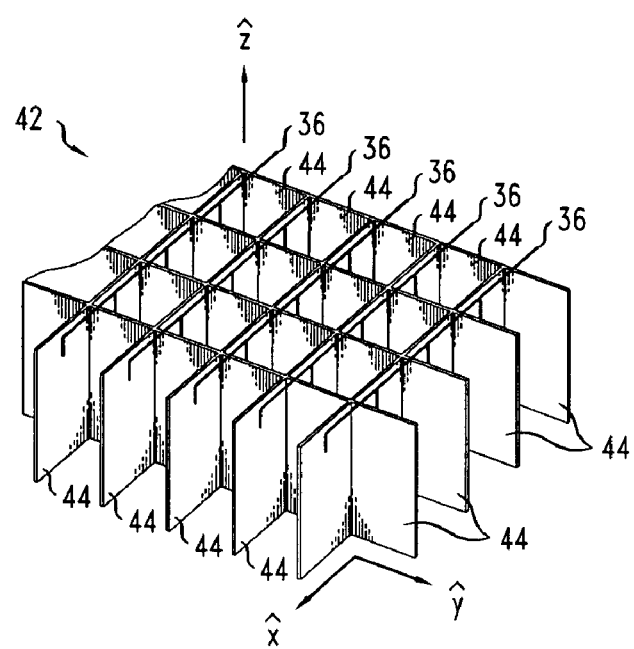
FIG. 7 is an oblique view of a slab of the stack structure shown in FIG. 6.

Referring to FIG. 7, each slab 42 includes a spatially regular array of identical, dielectric boards 44 and a layer of control lines 36. The dielectric boards 44 form a regular 2D lattice, e.g., a cubic lattice with a lattice length of about 5 mm. Exemplary dielectric boards 44 are made of 0.25 mm thick fiberglass and are about 10 mm high and about 5 mm wide. Control lines 36 connect to control devices such as switches or varactor diodes (not shown) on the dielectric boards 44. The control lines 36 are either optical fibers or electrical wires. If the control lines 36 are wires, they are preferably located to minimize their effect on plane electromagnetic radiation propagating in the refractive structure 32. For example, the wires may run substantially parallel to the propagation direction of such radiation to reduce interference with said radiation.

Figure 8:
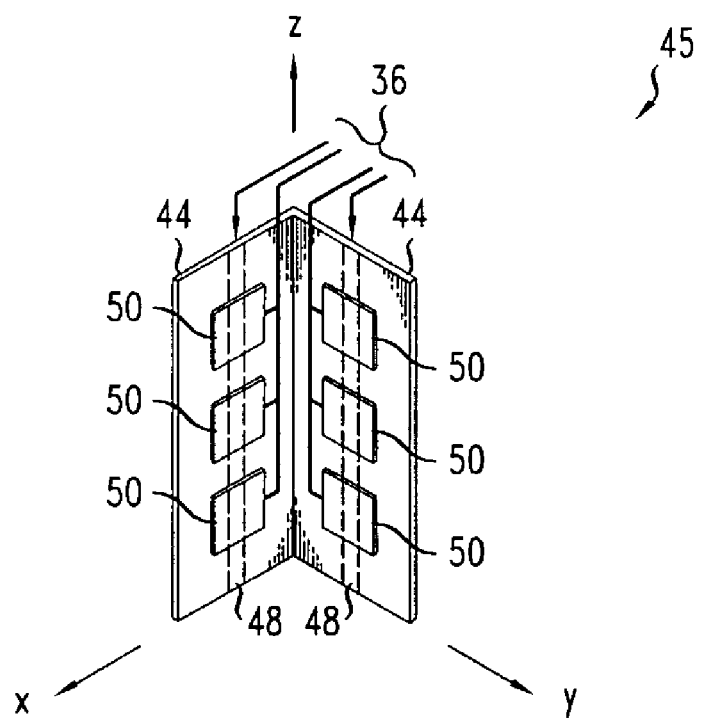
FIG. 8 is an oblique view of a unit cell of the regular 2D lattice of FIG. 7.

Referring to FIG. 8, a unit cell 45 of the cubic lattice includes two dielectric boards 44. Each dielectric board 44 includes a wire strip 48 and three split ring resonators (SRRs) 50. The wire strip 48 is on a central axis of the board's backside. The SRRs 50 are uniformly spread and centered on the same central axis of the board's front side. The wire strips 48 and SRRs 50 are circuit elements whose circuit states depend on the state of 2- or 3-terminal, electronic, control devices 46.

Exemplary electronic control devices 46 are controllable switches and varactor diodes. In switch-type control devices 46, the switch has two states, i.e., an open state and a closed state. In varactor diode-type control devices 46, the varactor diode has two or more states of different capacitance. The states of different capacitance are produced by different biasing voltages across the varactor diodes. These different biasing voltages may be reverse biasing voltages of different sizes or a reverse biasing voltage and a forward biasing voltage.

Figure 9:
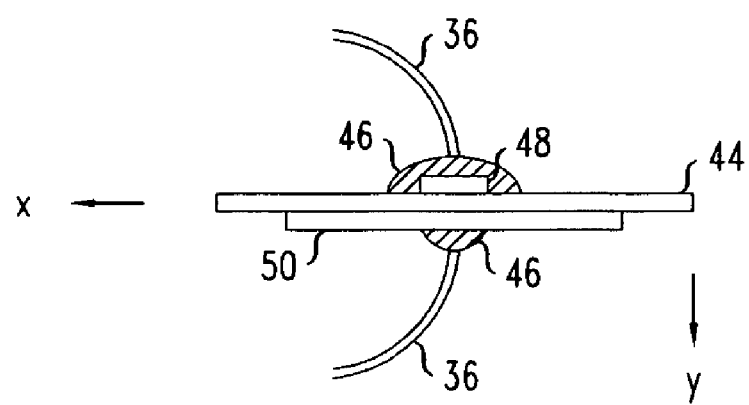
FIG. 9 is a cross-sectional view from the top of one circuit board of FIG. 8.

Referring to FIG. 9, the state of an electronic control device 46, e.g., opened or closed for switches, is determined by the form of optical or voltage control signals. The control signals are applied to the electronic control devices 46 via ends of control lines 36, i.e., optical fibers or wires.

Figure 10:
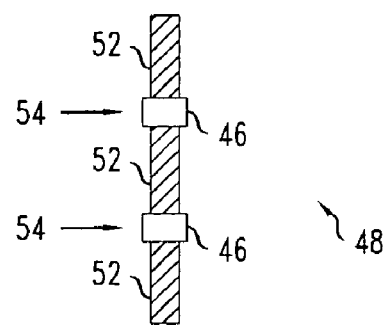
FIG. 10 is a front view of a controllable wire strip of FIGS. 8–9.

Referring to FIG. 10, each wire strip 48 includes a sequence of metallic conducting segments 52 separated by one or more capacitive gaps 54. Exemplary conducting segments 52 are copper layers having a thickness of about 0.03 mm and a width of about 0.25 mm. The total length of a sequence of the conducting segments 52 is about the same as the height of a dielectric board 44. The conducting segments 52 on opposite sides of each capacitive gap 54 are connected via an electronic control device 46, i.e., a switch or a varactor diode. One electronic control device 46 overlays each gap 54. When the electronic control devices 46 are switches, the conducting segments 52 of a sequence form circuit elements whose electrical properties are similar to those of continuous metallic strips of the same total length, width, and thickness if the switches are closed. Similarly, the conductive segments 52 of a sequence form a circuit element whose electrical properties are similar to those of a series of short strip conductors coupled by low capacitance gaps 54 when the switches are open. Similarly, when the control devices 46 are varactor diodes, the conducting segments 52 of a sequence form circuit elements whose electrical properties vary depending on the capacitance states of the varactor diodes.

Figure 11A:
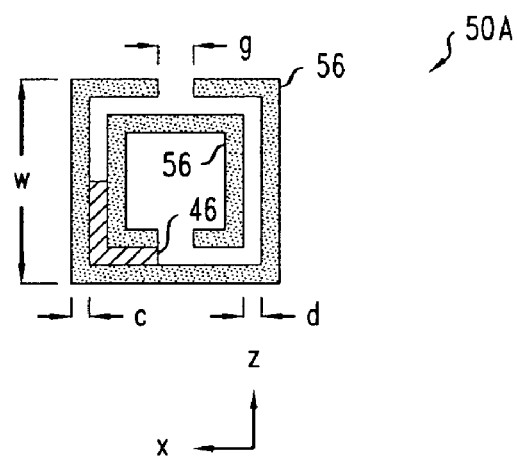
FIG. 11A is a front view of one embodiment of a controllable SRR of FIGS. 8–9.

Referring to FIG. 11A, one form 50A for SRR 50 of FIGS. 8–9 is a circuit element formed by two concentric metallic split rings 56 and a control device 46. Exemplary split rings 56 are fabricated of a 0.03 mm thick copper layer and may have various ring-like shapes. The exemplary SRR 50A has feature dimensions that satisfy: c=0.25 mm, d=0.30 mm, g=0.46 mm, and w=2.62 mm. In the SRR 50A, the electronic control device 46 forms a bridge between the inner and outer split rings 56 of the same SRR 50A. For varactor diode-type control devices 46, the concentric metallic split rings 56 form a circuit element whose capacitance depends on the capacitance-state of the varactor diodes. Similarly, for switch-type control devices 46, the concentric metallic split rings 56 form a circuit element with a very low capacitance when the switch is closed and a capacitor with a moderate capacitance when the switch is open. Increasing the capacitance of the electronic control device 46 lowers the magnetic resonance frequency, $\omega_{m0}$, of the SRR 50A, because the magnetic resonance frequency, $\omega_{m0}$, grows roughly as the capacitance between the metallic split rings 56 decreases.

Figure 11B:
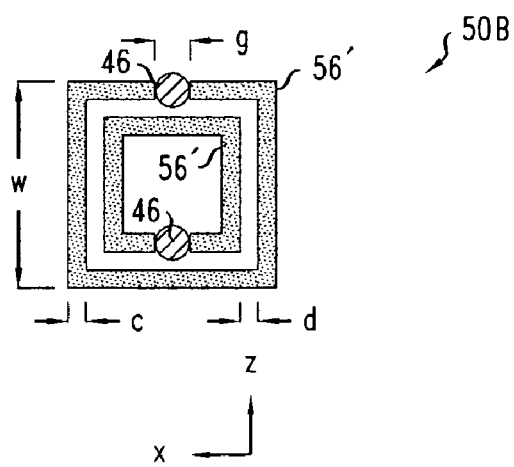
FIG. 11B is a front view of an alternate embodiment of a controllable SRR of FIGS. 8–9.

Referring to FIG. 11B, an alternate form 50B for SRR 50 of FIGS. 8–9 is a circuit element formed by two concentric metallic split rings 56' and one or more switch-type control devices 46. Exemplary metallic split rings 56' have the same composition and dimensions as the metallic split rings 56 of FIG. 11A. The one or more control devices 46 bridge the gap, g, that separates the ends of the inner and/or the outer metallic split rings 56'. For switch-type devices 46, the concentric metallic rings 56' form closed circuit elements when the switches are closed. Such closed elements have much higher magnetic resonance frequencies, $\omega_{m0}$, than the open circuit elements that exist when such control switches are open.

Figure 12A:
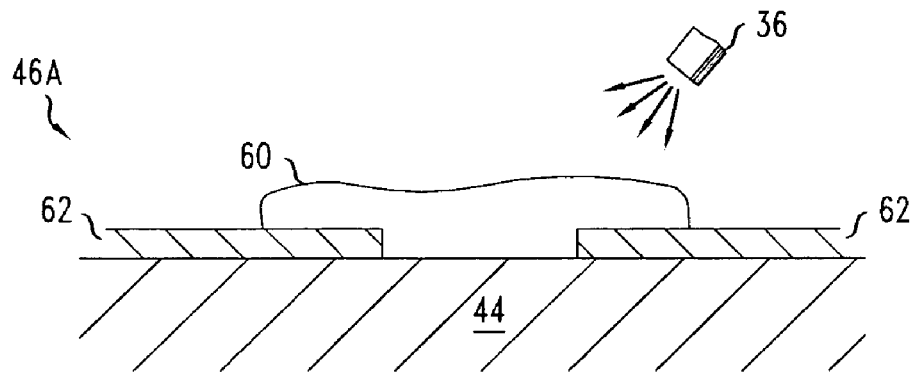
FIG. 12A is a cross-sectional view of a light-activated switch-type embodiment of one electronic control device of FIGS. 9, 10, 11A, and 11B.
Figure 12B:
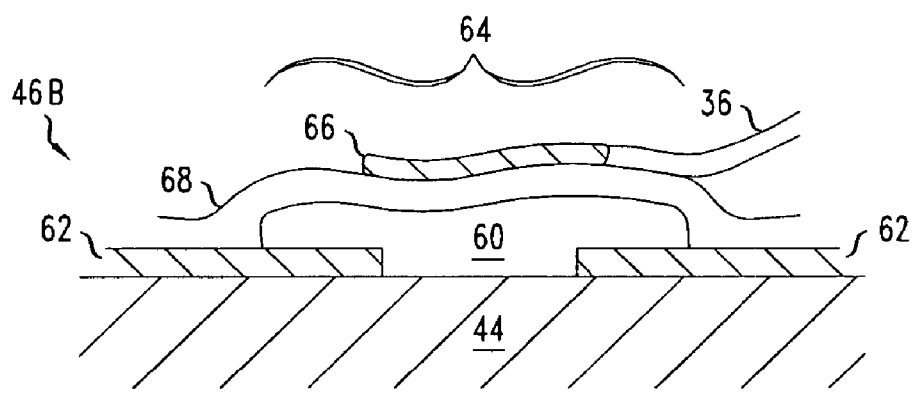
FIG. 12B is a cross-sectional view of an electronic switch-type embodiment of one electronic control device of FIGS. 9, 10, 11A, and 11B.
Figure 12C:
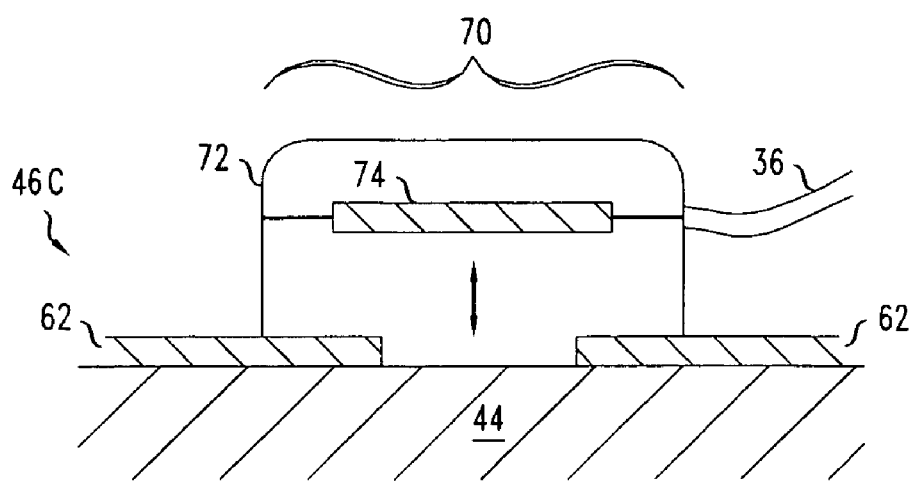
FIG. 12C is a cross-sectional view of a micro electromechanical switch-type embodiment of one electronic control device of FIGS. 9, 10, 11A, and 11B.

FIGS. 12A, 12B, and 12C show various switch-type embodiments 46A, 46B, 46C of electronic control devices 46 of FIGS. 9–10, 11A, and 11B.

Referring to FIG. 12A, light-sensitive, electronic, switch-type, control device 46A includes a semiconductor channel 60 that bridges a gap between conductors 62, i.e., conducting segments 52 of FIG. 10 or portions of metallic split rings 56, 56' of FIG. 11A or 11B. The light-sensitive switch 46A closes in response to light being delivered from an end of control line 36, i.e., an optical fiber. The light from the optical fiber excites carriers in the semiconductor channel 60 increasing the channel's conductivity thereby closing the control switch 46A. In absence of control light, the semiconductor channel 60 is a high resistance, open switch between the conductors 62.

Referring to FIG. 12B, electronic, switch-type, control device 46B is a field-effect transistor (FET) that bridges a gap between conductors 62, i.e., conducting segments 52 of FIG. 10 or portions of metallic split rings 56, 56' of FIG. 11A or 11B. The FET 64 includes gate electrode 66, gate dielectric layer 68, semiconductor channel 60 and source and drain electrodes that are formed by conductors 62. Control line 36, i.e., a wire, applies gate voltages that cause the switch 46B to open and close.

Referring to FIG. 12C, electromechanical switch-type control device 46C includes micro electromechanical system (MEMS) device 70 and conductors 62, i.e., conducting segments 52 of FIG. 10 or portions of metallic split rings 56, 56' of FIG. 11A or 11B. The MEMS device 70 includes a bendable arm 72 and a conductive strip 74 located on a surface of the movable arm 72. Control line 36, i.e., a wire, applies a voltage that controls the position of the movable arm 72, e.g., by the Coulomb force between a charged capacitor plate on the MEMS device 70 and a charged capacitor plate on board 44. Fabrication of such MEM devices 70 is well known to those of skill in the art. The applied voltage can cause the arm 72 to bend so that the conductive strip 74 moves into contact with conductors 62. This mechanical movement closes the electronic, switch-type, control device 46C. Discharging the capacitor causes the arm 72 to unbend so that the conductive strip 74 moves out of contact with the conductors 62 thereby opening the switch-type control device 46C.

Referring to FIGS. 5 and 6–10, control device 34 controls whether selected 3D regions of refractive structure 32 are in metamaterial states or are in normal refractive states. In both types of states, the real parts of $\in$ and $\mu$ have the same sign at a selected frequency, $\omega$ so that electromagnetic radiation of frequency $\omega$ will propagate through the 3D region with a real momentum. Since the real parts of $\in$ and $\mu$ have the same sign in both states, transforming the selected 3D region between the two refractive states requires changing signs of the real parts of both $\in$ and $\mu$. To do such transformations, the control device 34 simultaneously changes the circuit states of the SRRs 50 and the wire strips 48 of the transforming a selected 3D region. In the selected 3D region, the circuit state of the SRRs 50 determines the sign of the real part of $\mu$, and the circuit state of the wire strips 48 determines the sign of the real part of $\in$. The circuit states of both the wire strips 48 and the SRRs 50 depend on the states of electronic control devices 46 therein.

An array of the wire strips 48 produces an $\in$ with a negative real part between an electronic plasma frequency, $\omega_{ep}$, and an electronic resonance frequency, $\omega_{e0}$, and produces an $\in$ with a positive real part at other frequencies. The resonance frequency, $\omega_{e0}$, depends on the state of one or more control devices 46 in the wire strips 48. If the control devices 46 are varactor diodes, the resonant frequencies, $\omega_{e0}$, will be much lower when the varactor diodes are in a low capacitance state than when the varactor diodes are in a higher capacitance state. In particular, higher capacitances between the segments 52 of the wire strips 48 increase the value of $\omega_{e0}$. Similarly, if the control devices 46 are switches, the resonant frequency, $\omega_{e0}$, will also be much lower when the switches are in a closed state than when the switches are an open state.

Similarly, a 3D array of the SRRs 50 produces a $\mu$ with a negative real part between a magnetic plasma frequency, $\omega_{mp}$, and a magnetic resonance frequency, $\omega_{m0}$, and produces a $\mu$ with a positive real part at other frequencies. The resonance frequency, $\omega_{m0}$, depends on the state of electronic control devices 46 in the SRRs 50. In the embodiment of FIG. 11A, SRR 50 has a lower resonant frequency, $\omega_{m0}$, when electronic control device 46 is in a lower capacitance state. For varactor diode-type control devices 46, applying a control voltage that lowers the varactor diode's capacitance produces such a state. For switch-type control devices 46, closing the switches produces such a lower capacitance state. In the embodiment of FIG. 11B, closing the gaps, g, in the split rings 56' typically raises $\omega_{m0}$'s of SRRs 50B. Thus, in switch-type control devices 46, closing the switches increases $\omega_{m0}$'s of the SRRs 50B.

Figure 13:
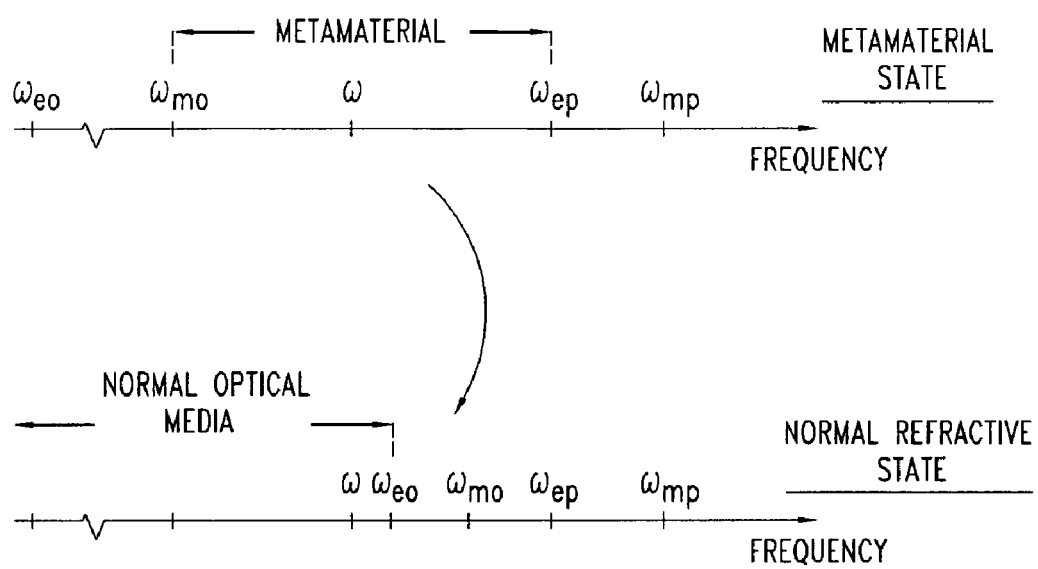
FIG. 13 shows how electrical and magnetic properties of an exemplary medium transform between the metamaterial state and the normal refractive state.

FIG. 13 illustrates how a movement of resonant frequencies $\omega_{m0}$ and $\omega_{e0}$ can change the refractive state of a 3D region. In the metamaterial state, a selected frequency $\omega$ is located inside both interval [$\omega_{e0}$, $\omega_{ep}$] and interval [$\omega_{m0}$, $\omega_{mp}$]. For the exemplary embodiments of FIGS. 6–11B and switch-type control devices 46, closing the control switches 46 of wire strips 48 and opening control switches 46 of the SRRs 50 causes ω to be located inside $[\omega_{e0}, \omega_{ep}]$ and $[\omega_{m0}, \omega_{mp}]$ for selected dimensions of the wire strips 48, split rings 50, and 3D lattice. Exemplary embodiments are designed with dimensions that produce such a metamaterial state at a frequency between 9 and 12 giga hertz (GHz). In the normal refractive state, the same selected frequency ω is located outside both interval $[\omega_{e0}, \omega_{ep}]$ and interval $[\omega_{m0}, \omega_{mp}]$. For the embodiments of FIGS. 6–11B and switch-type control devices 46, opening the control switches 46 of the wire strips 48 and closing the control switches 46 of the SRRs 50 causes the selected frequency ω to be outside $[\omega_{e0}, \omega_{ep}]$ and $[\omega_{m0}, \omega_{mp}]$. This results due to the shift in $\omega_{e0}$ caused by the capacitances of gaps 54 and the shift in $\omega_{m0}$ caused by either the low capacitances of shorted rings 56 or the closure of metallic rings 56'.

In other embodiments, movements of the plasma frequencies $\omega_{ep}$ and $\omega_{mp}$ could also transform the refractive state of a 3D region of refractive structure 32. As in FIG. 13, a selected frequency ω is located inside intervals $[\omega_{e0}, \omega_{ep}]$ and $[\omega_{m0}, \omega_{mp}]$ when the 3D region is a metamaterial and is located outside of these intervals when the 3D region is a normal refractive medium. Movement of the boundaries of the two intervals by shifts of $\omega_{ep}$ and $\omega_{mp}$ typically could require effective increases of lattice lengths of the 3D arrays formed by the circuit elements.

The controllable refractive properties of device 30 are useful for passive beam steering in both wireless transmitters and wireless receivers. The beam steering could enable steering transmission directions and reception directions of the wireless towers in cellular telephone network.

Figure 14:
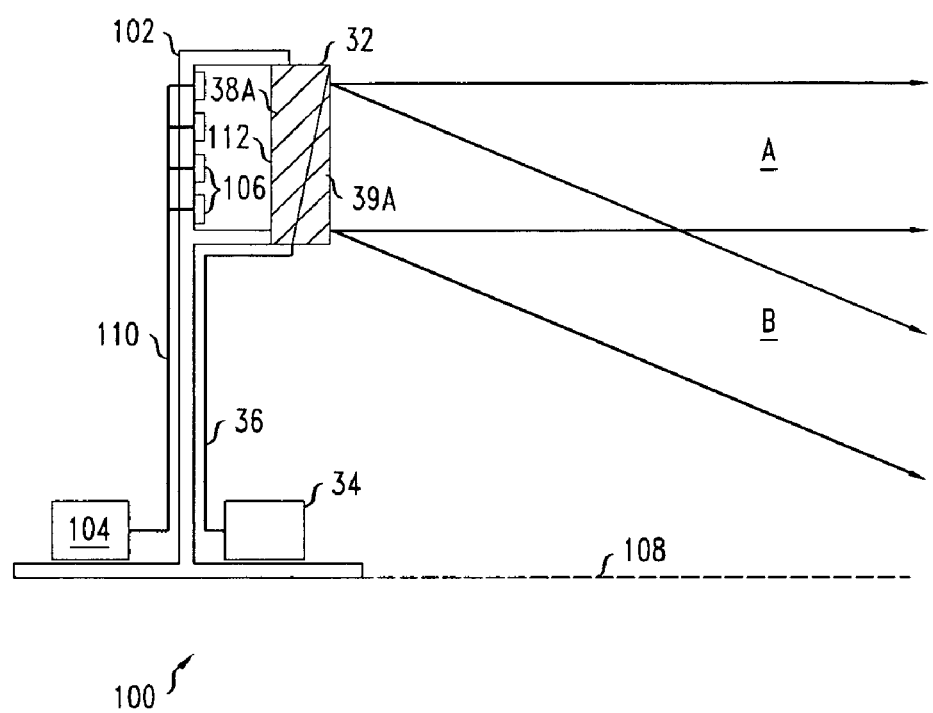
FIG. 14 is a cross-sectional view of a wireless transmitter based on a controllable refractive medium.

FIG. 14 shows an exemplary wireless transmission system 100 with a passive beam steering apparatus, e.g., device 30 of FIGS. 5 and 5A. The wireless transmission system 100 includes vertical transmission tower 102, electrical wireless transmission driver 104, transmission antennae 106, controllable refractive structure 32, and control device 34. The transmission tower 102 holds the transmission antennae 106, i.e., wireless transmitters, and refractive structure 32 at a fixed height above ground level 108 and at fixed relative positions. The transmission antennae 106 form a spatially regular one-dimensional or two-dimensional array. In operation, the electrical driver 104 generates a modulated electrical carrier on cable 110, and the signal drives the transmission antennae 106 in-phase at a selected wireless transmission frequency. The modulated electrical carrier drives the transmission antennae 106 so that the spatial array produces an output beam with a quasi-planar phase front, e.g., at a microwave carrier frequency of about 2 GHz. The refractive structure 32 intercepts the output beam with the quasi-planar phase front from the array of transmission antennae 106. The control device 34 generates control signals on line 36 to control the refractive state of a wedge-shaped region 38A of refractive structure 32. The wedge-shaped region 38A can be in a normal refractive state or a metamaterial state at the selected wireless transmission frequency of the driver 104.

In the wireless transmission system 100, refractive structure 32 provides for passive and reconfigurable steering of the electromagnetic radiation beam that is produced by the array of transmission antennae 106. The steering is reconfigurable so that the beam can be redirected in various selected target directions, e.g., directions A or B. The selectable target directions may, e.g., lie in one vertical plane or lie in one horizontal plane. To change the beam's target direction, e.g., from A to B, the state of a wedge-shaped region 38A of the refractive structure 32 is transformed between the normal refractive state and the metamaterial state. The transformation involves reconfiguring electronic control devices 46 of wire strips 48 and SRRs 50 therein. In one state, the refractive structure 32 nontrivially refracts the electromagnetic beam at one or more interfaces between metamaterial medium 38A and adjacent normal refractive medium, e.g., air and/or normal refractive region 39A.

Given equal incident angles, an interface between a metamaterial and a normal refractive medium will more strongly deviate an incident beam than an interface between two normal refractive media. For that reason, the refractive structure 32 can typically be thinner and typically will require less space than a conventional passive refractive structure providing the same amount of beam deviation without metamaterials. This fact and the controllability of the beam direction provide large advantages to wireless transmitters and receivers that incorporate refractive structure 32 over conventional wireless transmitters and receivers that are based on normal refractive media (not shown).

In an exemplary wireless transmission system 100, array of transmission antennae 106 produces a beam that has a planar and in-phase wavefront, is horizontal, and is normally incident on first surface 112 of refractive structure 32. In the metamaterial state, exemplary refractive structure 32 has a refractive index of $-[(1+\sqrt{2})/(1-\sqrt{2})]^{1/2}$ to $-[(1-\sqrt{2})/(1+\sqrt{2})]^{1/2}$ and preferably has a refractive index of about −1 at the selected transmission frequency. Such values for the refractive index reduce power losses by lowering back reflections of the incident beam of electromagnetic radiation at the front surface 112.

In applications to base stations of cellular telephone networks, the refractive structure 32 may deviate the intercepted electromagnetic beam downward from the horizontal to ground level 108 by between 0 to 8 degrees. The controllable steering of the beam of electromagnetic radiation can be used to reduce signal pollution in adjacent cells of the cellular telephone network.

Other embodiments provide wireless receiver systems based on reconfigurable refractive structure 32. The layouts of such systems may be similar to that of wireless transmission system 100 of FIG. 14 with the following replacements. The electrical wireless transmission driver 104 is replaced by an electrical receiver and the transmission antennae 106 are replaced by receiver antennae, i.e., wireless receivers. In operation, the electrical receiver 104 receives a modulated electrical carrier on cable 110. The modulated carrier is produced by a beam of electromagnetic radiation being captured in the receiver antennae 106 of the array. The refractive structure 32 intercepts the beam of received wireless communication beam and steers the beam from a selected reception direction, e.g., direction A or B, to the array of antennae 106. For that reason, the refractive structure 32 again provides for passive and reconfigurable steering of the electromagnetic radiation beam that so that beams from different directions, e.g., directions A or B, can be selectably captured by the antennae 106 of the receiving array.

Figure 15:
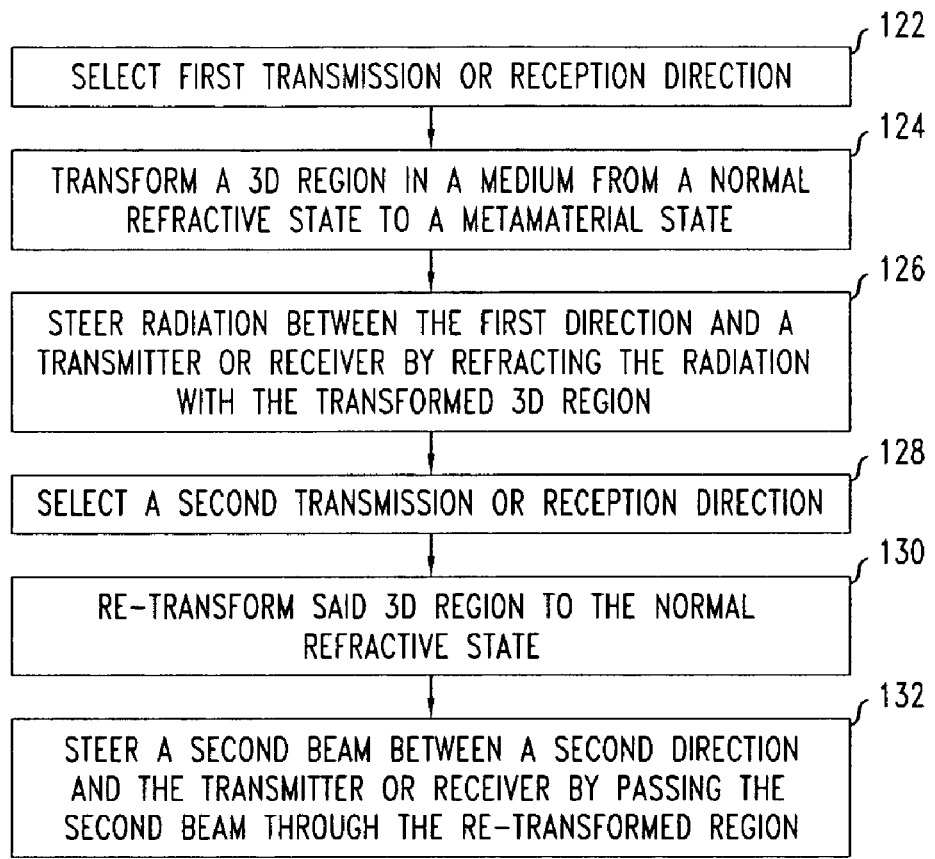
FIG. 15 is a flow chart that illustrates an embodiment of a method for operating a wireless transmitter or receiver such as the transmitter of FIG. 14.

FIG. 15 shows an exemplary method 120 of operating a wireless transmitter or receiver, e.g., transmitter 100 of FIG. 14. The method 120 includes selecting a first transmission or reception direction for a wireless communication, e.g., a direction of a selected cell of a cellular network (step 122). The method 120 includes transmitting optical or electrical control signals to a 3D medium to transform a 3D region therein from being in a normal refractive state to being in a metamaterial state at a selected frequency (step 124). The transforming step, e.g., involves changing states of electronic control devices 46 of wire strips 48 and SRRs 50 in the 3D region by opening and/or closing switches of switch-type control devices 46 or by changing capacitances of varactor diodes of varactor diode-type control devices 46. The method 120 includes steering a beam of electromagnetic radiation between the selected first direction and one of a wireless transmitter and a wireless receiver (step 126). The steered radiation has the selected frequency. The steering step includes refracting the beam of electromagnetic radiation at an interface between the transformed 3D region and a normal refractive medium.

The exemplary method 120 includes selecting a second direction for wireless transmission or reception (step 128). The second and first selected directions are different. The method 120 includes changing the control signals being transmitted to the 3D medium to re-transform said 3D region back to the normal refractive state at the selected frequency (step 130). The method 120 includes then, steering a second beam of electromagnetic radiation beam between the selected second direction and the wireless transmitter or wireless receiver (step 132). The second beam of electromagnetic radiation again has the selected frequency. The steering of the second beam includes passing the second beam through the re-transformed 3D region.

Other embodiments of the invention will be apparent to those skilled in the art in light of the specification, drawings, and claims of this application.

What is claimed is:

1. An apparatus, comprising:
    a 3D array of circuit elements; and
    a plurality of control lines for coupling a remote control device to the circuit elements in the 3D array;
    wherein each circuit element is configured to transform from one circuit state to another circuit state in response to a change in a control signal received from one of the control lines; and
    wherein a 3D region of the 3D array behaves as a metamaterial at a frequency when the circuit elements of the 3D region are in one set of circuit states and behaves as a normal refractive medium at the same frequency when the circuit elements of the 3D region are in another set of circuit states.

2. The apparatus of claim 1, wherein the circuit elements comprise split ring resonators and wire strips; and
    wherein a portion of the circuit elements of the array comprises switches or varactor diodes connecting conductive portions of the same circuit elements.

3. The apparatus of claim 1, wherein a portion of the individual circuit elements comprise switches or varactor diodes, the switches or varactor diodes being able to transform associated ones of the circuit elements between associated ones of the circuit states.

4. The apparatus of claim 3, wherein the switches or varactor diodes are responsive to the control signals received from associated ones of the control lines.

5. The apparatus of claim 1, further comprising:
    the control device, the control device being connected to the control lines and being configured to produce the control signals on the control lines.

6. The apparatus of claim 5, wherein the 3D region is smaller than the entire 3D array.

7. A system for wireless transmission or wireless reception, comprising:
    one of a wireless transmitter and a wireless receiver, the one of a transmitter and a receiver having a wireless communication frequency; and
    a refractive medium located to intercept beams of the electromagnetic radiation one of transmitted from the transmitter and received by the receiver; and
    wherein the refractive medium includes a 3D region capable of transforming between first and second states, the 3D region being a metamaterial at the wireless communication frequency when in the first state and being a normal refractive medium at the wireless communication frequency when in the second state; and
    wherein the refractive medium is configured to steer one of the intercepted beams between a first direction and the one of a wireless transmitter and a wireless receiver when the 3D region is in the first state and is configured to steer one of the intercepted beams between a different second direction and the one of a transmitter and a receiver when the 3D region is in the second state.

8. The system of claim 7, further comprising a tower that supports the one of a transmitter and a receiver and refractive medium at a vertical distance above ground level.

9. The system of claim 7, further comprising:
    a control device;
    a plurality of lines coupling the control device to the refractive medium;
    wherein the control device is configured to transmit optical or electrical control signals to the lines to transform the 3D region between the first and second states.

10. The system of claim 9, wherein the medium comprises a 3D array of switches or varactor diodes responsive to the control signals on the control lines.

11. The system of claim 10, wherein the medium includes a regular 3D array of substantially identical circuit elements, the switches or varactor diodes being able to transform circuit states of the identical circuit elements.

12. The system of claim 7, wherein the 3D region has a smaller volume than the 3D medium.

13. The system of claim 7, wherein the first direction and the second direction are directions of the intercepted beams from the medium.

14. A method for wireless transmission or wireless reception, comprising:
    selecting a first transmission or reception direction for a wireless communication;
    transmitting optical or electrical control signals to transform a region of a 3D medium from being in a normal refractive state at a selected frequency to being in a metamaterial state at the frequency; and
    then, steering a beam of electromagnetic radiation between the selected first direction and one of a wireless transmitter and a wireless receiver, the radiation having the selected frequency, the steering including refracting the beam at an interface between the region and a normal refractive medium.

15. The method of claim 14, further comprising:
    selecting a second direction for wireless transmission or reception, the second and first directions being different;
    changing the control signals being transmitted to re-transform the region back to being in the normal refractive state at the selected frequency; and
    then, steering a second beam of electromagnetic radiation beam between the selected second direction and the one of a wireless transmitter and a wireless receiver, the second beam of electromagnetic radiation having the selected frequency, the steering a second beam including passing the second beam through the 3D medium.

16. The method of claim 15, wherein the 3D medium comprises a regular 3D array of circuit elements and the step of transmitting a control signal changes states of switches or varactor diodes located in the region.

17. The method of claim 16, wherein the region of the 3D refractive medium is wedge-shaped.

* * * * *